US012001435B2

(12) United States Patent
Yang et al.

(10) Patent No.: US 12,001,435 B2
(45) Date of Patent: *Jun. 4, 2024

(54) MANAGING DATABASE OFFSETS WITH TIME SERIES

(71) Applicant: eBay Inc., San Jose, CA (US)

(72) Inventors: Connie W. Yang, Saratoga, CA (US); Daniel Graham Douglas, Los Gatos, CA (US)

(73) Assignee: eBay Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/536,705

(22) Filed: Nov. 29, 2021

(65) Prior Publication Data
US 2022/0083556 A1 Mar. 17, 2022

Related U.S. Application Data

(63) Continuation of application No. 16/393,404, filed on Apr. 24, 2019, now Pat. No. 11,216,466.

(51) Int. Cl.
G06F 16/2455 (2019.01)
G06F 16/22 (2019.01)
G06F 16/2458 (2019.01)

(52) U.S. Cl.
CPC .... *G06F 16/24568* (2019.01); *G06F 16/2228* (2019.01); *G06F 16/2477* (2019.01)

(58) Field of Classification Search
CPC .......... G06F 16/24568; G06F 16/2228; G06F 16/2477
USPC ........................................................ 707/746
See application file for complete search history.

(56) References Cited

U.S. PATENT DOCUMENTS

| 6,798,427 B1 | 9/2004 | Suzuki et al. |
| 8,438,275 B1 * | 5/2013 | Brooker .................. H04L 67/02 709/224 |
| 9,514,175 B2 | 12/2016 | Swan et al. |
| 9,699,049 B2 | 7/2017 | Gupta et al. |

(Continued)

FOREIGN PATENT DOCUMENTS

| CN | 103279530 B | 7/2016 |
| CN | 106648446 A | 5/2017 |

OTHER PUBLICATIONS

Amazon Managed Streaming for Kafka, Developer Guide, 2019, 38 Pages.

(Continued)

*Primary Examiner* — Shahid A Alam
(74) *Attorney, Agent, or Firm* — FIG. 1 Patents

(57) ABSTRACT

Systems and methods of improving the functioning of a streaming platform system by managing database change stream offsets using a time series database are disclosed. In some example embodiments, a computer system retrieves an offset value from a plurality of offset values stored in a time series database, with the plurality of offset values being indexed in the time series database in time order, and the retrieved offset value being retrieved using a time parameter, and then the computer system transmits a data request to a stream-processing platform, with the data request comprising the retrieved offset value, and the data request being operable to retrieve a data record stored in association with the retrieved offset value in a storage layer of the stream-processing platform using the offset value.

20 Claims, 10 Drawing Sheets

(56) References Cited

U.S. PATENT DOCUMENTS

| | | | | |
|---|---|---|---|---|
| 9,734,194 | B1* | 8/2017 | Dixit | G06F 16/2477 |
| 10,095,756 | B2 | 10/2018 | Park et al. | |
| 10,204,147 | B2 | 2/2019 | Crabtree et al. | |
| 10,664,474 | B1* | 5/2020 | Chunduru | G06F 16/2435 |
| 11,216,466 | B2 | 1/2022 | Yang et al. | |
| 2002/0115457 | A1* | 8/2002 | Koscal | H04W 24/00 |
| | | | | 455/466 |
| 2004/0103077 | A1 | 5/2004 | Robert, III et al. | |
| 2005/0185697 | A1 | 8/2005 | Gargin | |
| 2007/0024722 | A1* | 2/2007 | Eura | G11B 27/34 |
| | | | | 707/E17.026 |
| 2015/0095381 | A1 | 4/2015 | Chen et al. | |
| 2015/0270936 | A1 | 9/2015 | Han et al. | |
| 2016/0328432 | A1* | 11/2016 | Raghunathan | G06F 16/2264 |
| 2016/0378814 | A1* | 12/2016 | Bowman | G06F 16/2322 |
| | | | | 707/604 |
| 2017/0064027 | A1 | 3/2017 | Grenader | |
| 2017/0177636 | A1* | 6/2017 | Nguyen | G06F 16/2255 |
| 2017/0201606 | A1* | 7/2017 | Ding | G06F 1/14 |
| 2017/0364562 | A1 | 12/2017 | Wittkotter | |
| 2018/0114269 | A1 | 4/2018 | Kuck et al. | |
| 2018/0278481 | A1 | 9/2018 | Prasad et al. | |
| 2019/0205296 | A1* | 7/2019 | White | G06F 16/2455 |
| 2020/0341986 | A1 | 10/2020 | Yang et al. | |

OTHER PUBLICATIONS

Amazon MSK FAQs, Retrieved from the Internet URL: <https://aws.amazon.com/msk/faqs/>, Accessed on May 14, 2019, 13 pages.

Amazon MSK features, Retrieved from the Internet URL : <https://aws.amazon.com/msk/features/>, Accessed on May 14, 2019, 6 pages.

Creating an Amazon MSK Cluster, Amazon Managed Streaming for Apache Kafka, Developer Guide, Retrieved from the Internet URL: https://docs.aws.amazon.com/msk/latest/developerguide/msk-create-cluster.html, 2019, 3 pages.

Getting Started Using Amazon Managed Streaming for Kafka, Retrieved from the Internet URL: <https://docs.aws.amazon.com/msk/latest/developerguide/getting-started.html>, Accessed on May 23, 2019, 2 pages.

Time series database (TSDB) explained | InfluxData, Retrieved from the Internet URL: https://web.archive.org/web/20190328032005/https://www.influxdata.com/time-series-database/, Accessed on Jan. 21, 2022, 15 Pages.

What Is Amazon Managed Streaming for Kafka?, Amazon Managed Streaming for Apache Kafka, Developer Guide, Retrieved from the Internet URL: https://docs.aws.amazon.com/msk/latest/developerguide/what-is-msk.html, 2019, 3 bages.

Non Final Office Action Received for U.S. Appl. No. 16/393,404, dated May 4, 2021, 12 pages.

Notice of Allowance Received for U.S. Appl. No. 16/393,404, dated Aug. 27, 2021, 11 pages.

Daskalaki,"Time-Series with Kafka, Kafka Connect & InfluxDB", Retrieved from the Internet URL: https://www.andoop.com/blog/2016/12/kafka-influxdb/, Dec. 1, 2016, 11 pages.

Derosiaux, "Looking at Kafka's consumers' offsets", Retrieved from the Internet URL: https://www.sderosiaux.com/articles/2017/08/07/looking-at-kafka-s-consumers-offsets/, Aug. 7, 2017, 24 Pages.

Lebedevich, "Prototyping Long Term Time Series Storage with Kafka and Parquet", Retrieved from the Internet URL: https://mabrek.github.io/blog/kafka-parquet-timeseries/, Oct. 25, 2015, 6 pages.

Namiot, "Time Series Database", Retrieved from the Internet URL: <https://www.researchgate.net/publication/286732446_Time_Series_Database>, Oct. 13-16, 2015, pp. 132-137.

Rastogi,"Analyzing time-series data using KSQL, influxDB and Grafana", Retrieved from Internet URL: https://medium.com/@raghavrastogi594/analyzing-time-series-data-using-ksql-influxdb-and-grafana-636c19393cf6, Apr. 3, 2018, 5 Pages.

Sfikas,"Smart Systems IoT Use Case with open source Kafka, Flink & CrateDB", Ververica, Retrieved from the Internet URL: https://www.ververica.com/blog/smart-systems-iot-use-case-open-source-kafka-flink-cratedb, Feb. 12, 2019, 7 Pages.

\* cited by examiner

DISTRIBUTED DATA STORE FOR LOGS ~220

| OFFSET | CHANGE DATA |
|--------|-------------|
| OFFSET-1 | CHANGE DATA-1 |
| OFFSET-2 | CHANGE DATA-2 |
| OFFSET-3 | CHANGE DATA-3 |
| OFFSET-4 | CHANGE DATA-4 |
| OFFSET-5 | CHANGE DATA-5 |
| OFFSET-6 | CHANGE DATA-6 |
| OFFSET-7 | CHANGE DATA-7 |
| OFFSET-8 | CHANGE DATA-8 |
| ⋮ | ⋮ |
| OFFSET-N | CHANGE DATA-N |

*FIG. 4*

MANAGING DATABASE OFFSETS WITH TIME SERIES

RELATED APPLICATIONS

This application is a continuation of and claims priority to U.S. patent application Ser. No. 16/393,404, filed Apr. 24, 2019, entitled "Managing Database Offsets With Time Series", the entire disclosure of which is hereby incorporated by reference herein in its entirety.

TECHNICAL FIELD

Embodiments of the present disclosure relate generally to the technical field of an electrical computer system architecture and, more particularly, but not by way of limitation, to systems and methods of improving the functioning of a streaming platform system by managing database offsets using a time series database.

BACKGROUND

A streaming platform system processes incoming streams of data records of an online service. For example, a stream of data records may comprise data change events comprising changes to content of an online service, which may be processed by the streaming platform system as those changes are submitted by producers of the content. However, streaming platform systems suffer from technical problems associated with consumers (e.g., consuming processes) of the streaming platforms systems accessing all of the data change events, such as when a consumer attempts to start, or restart, an application at a particular point in a data stream (e.g., attempting to back up or replay the data stream from an earlier point in time in order to recover from a system failure). Current solutions for a consumer to access starting an application at a particular point in a data stream on a streaming platform system rely on distributed file-based storage or other inefficient mechanisms that require extensive computer processing activity, thereby resulting in excessive consumption of electronic resources (e.g., processing power, memory, network bandwidth). Additionally, current solutions require specific versions of an application program interface (API) to access the offsets that are used to identify the particular point in the data stream at which to start the application, thereby limiting access and use of the streaming platform system. Furthermore, current solutions do not efficiently enable consumers to accurately identify the appropriate point in the data stream at which to start the application or otherwise access data. Other technical problems can arise as well.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 4 illustrates a distributed data store for log files, in accordance with some example embodiments.

DETAILED DESCRIPTION

Figure 1:
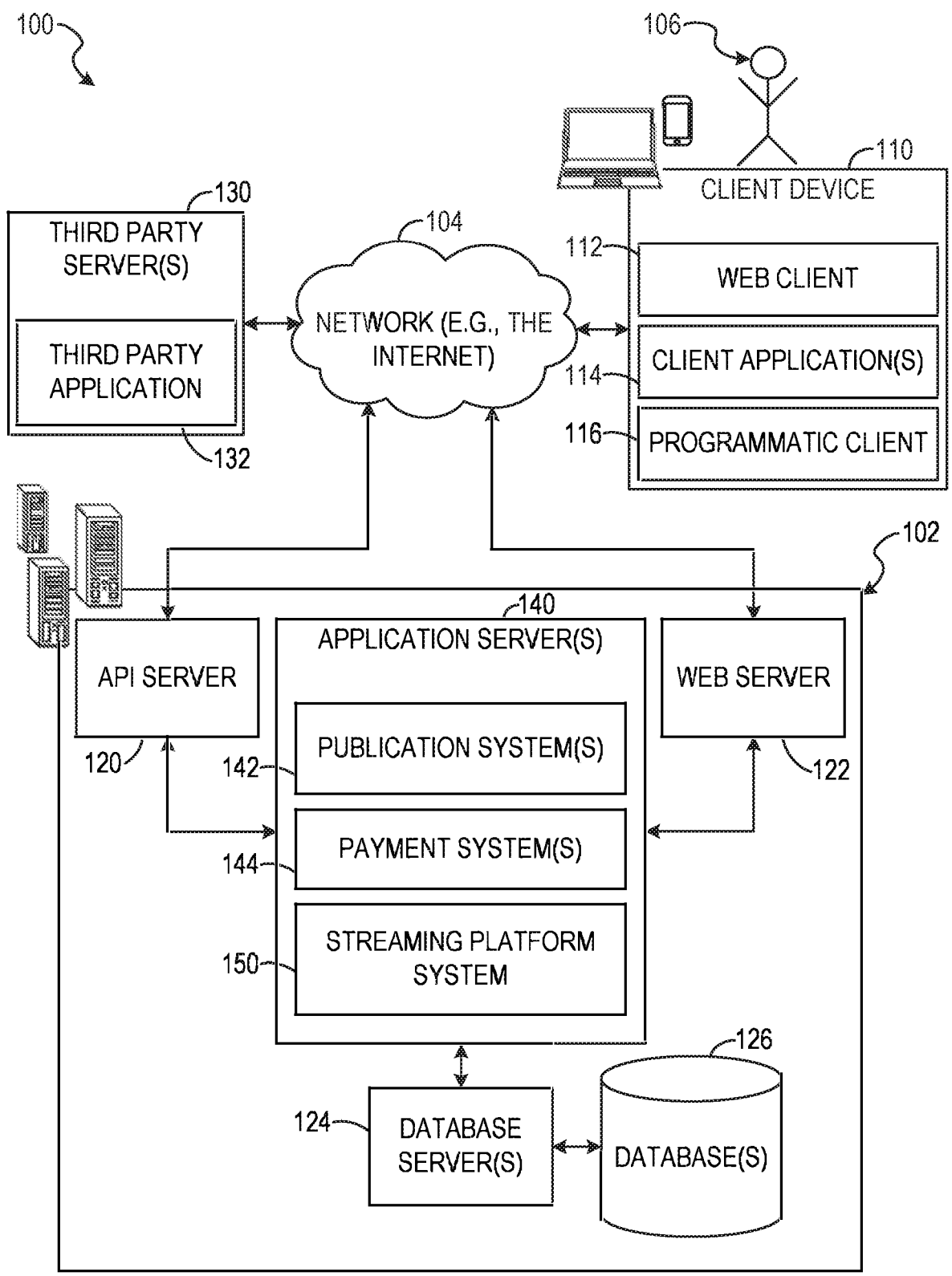
FIG. 1 is a block diagram illustrating a networked system, in accordance with some example embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

The present disclosure provides technical solutions for improving the functioning of a streaming platform system, or any other type of computer system, by managing database offsets using a time series database. In some example embodiments, a computer system having a memory and at least one hardware processor uses a time series database to store offsets for a streaming platform system so that a data stream of the streaming platform system may be accurately, effectively, and efficiently repositioned to a particular time (e.g., to just before a system failure) by using a time parameter corresponding to that particular time. In some example embodiments, the time parameter is used by the computer system to retrieve an offset value from the time series database, and the retrieved offset value is then used to reposition the data stream of the streaming platform system to a point corresponding with the offset value or to otherwise retrieve a data record corresponding to the particular time of the time parameter.

The implementation of the features disclosed herein involves a non-generic, unconventional, and non-routine operation or combination of operations. By applying one or more of the solutions disclosed herein, some technical effects of the system and method of the present disclosure are to improve the accuracy, effectiveness, and efficiency of accessing specific points in a data stream of a streaming platform computer system. The functional operations and features disclosed herein facilitate recovery of the streaming platform computer system from network or system failure and reduce data query errors. For example, because times may be used to query for data, the exact data needed for analysis may be retrieved—in contrast, if offsets are used, more of the stream may be required because of uncertainty of the stream data required or an incorrect amount of the stream data may be retrieved. In this way, providing a mapping between offsets and time allows for more data accuracy in the queries as well as improved network bandwidth. Further still, because the exact data required for analysis is queried, it reduces the processor cycles required for analysis since processor cycles are not expended on analysis of unnecessary data retrieved by offsets. Additionally, the use of a time series database to manage offsets, as disclosed herein, reduces dependency on a specific version of an API to identify and access a particular point in the data stream, thereby improving the flexibility and accessibility of the streaming platform computer system. As a result, the functioning of the computer system is improved because it is more resilient to component changes. Other improvements to the functioning of a computer or machine are also apparent from this disclosure.

In some example embodiments, operations are performed by a computer system or other machine having a memory and at least one hardware processor, with the operations comprising: retrieving an offset value from a plurality of offset values stored in a time series database, the plurality of offset values being indexed in the time series database in time order, and the retrieved offset value being retrieved using a time parameter; and transmitting a data request to a stream-processing platform, the data request comprising the retrieved offset value, and the data request being operable to retrieve a data record stored in association with the retrieved offset value in a storage layer of the stream-processing platform using the offset value. In some example embodiments, the data request is further operable to reposition a stream of data published from the stream-processing platform to an application at a position corresponding to the offset value.

In some example embodiments, the operations further comprises: prior to the retrieving of the offset value, receiving a series of data records; for each one of the data records in the series of data records, storing the one of the data records in the storage layer of the stream-processing platform in association with a corresponding one of the plurality of offset values; and for each one of the plurality of offset values, storing the one of the plurality of offset values in the time series database.

In some example embodiments, the time parameter comprises a single point in time. In some example embodiments, the time parameter comprises a time range having a start time and an end time. However, other indications of time may be used as the time parameter as well.

In some example embodiments, the data record comprises change data indicating at least one change to content of an online site. However, the data record may comprise other types of data as well.

In some example embodiments, the retrieving of the offset value is performed in response to an interruption of the stream-processing platform publishing a stream of data to an application. However, the retrieving of the offset value may be triggered in other ways as well.

The methods or embodiments disclosed herein can be implemented as a computer system having one or more modules (e.g., hardware modules or software modules). Such modules can be executed by one or more hardware processors of the computer system. The methods or embodiments disclosed herein can be embodied as instructions stored on a machine-readable medium that, when executed by one or more processors, cause the one or more processors to perform the instructions.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Washington State), an application 114, and a programmatic client 116 executing on client device 110.

The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 may host one or more publication systems 142, payment systems 144, and a streaming platform system 150, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 provides a number of publication functions and services to users 106 that access the networked system 102. The payment systems 144 likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The streaming platform system 150 provides functionality operable to perform various stream processing operations, as will be discussed in further detail below. The streaming platform system 150 may access the data from the databases 126, the third party servers 130, the publication system 142, and other sources. In some example embodiments, the streaming platform system 150 may analyze the data to perform stream processing operations. In some example embodiments, the streaming platform system 150 communicates with the publication systems 142 (e.g., accessing item listings) and payment system 144. In an alternative embodiment, the streaming platform system 150 is a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The publication system 142, payment system 144, and streaming platform system 150 can also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, California) to enable sellers to author and manage listings on the networked system 102 in an off-line manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party web site may, for example, provide one or more promotional, marketplace, or payment functions that are supported by the relevant applications of the networked system 102.

Figure 2:
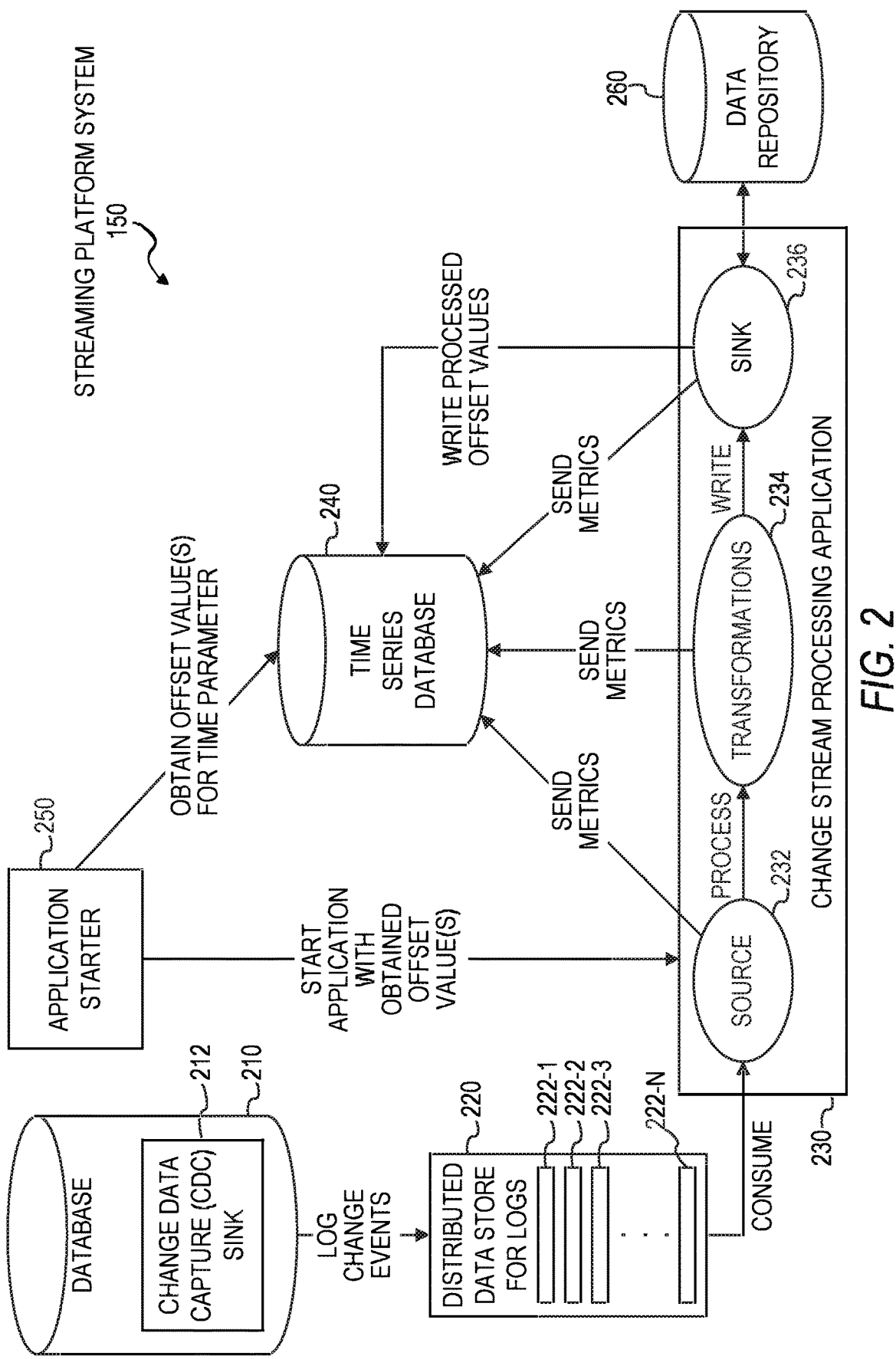
FIG. 2 illustrates a streaming platform system, in accordance with some example embodiments.

FIG. 2 illustrates the streaming platform system 150, in accordance with some example embodiments. The streaming platform system 150 is configured to perform the operations and implement the features disclosed herein. In some example embodiments, the streaming platform system 150 comprises any combination of one or more of a database 210, a distributed data store 220 for log files 222, a change stream processing application 230, a time series database 240, an application starter 250, and a data repository 260. The database 210, the distributed data store 220, the change stream processing application 230, the time series database 240, the application starter 250, and the data repository 260 are communicatively coupled to each other, such as via a communication network (e.g., network 104 in FIG. 1). In some example embodiments, the database 210, the distributed data store 220, the change stream processing application 230, the time series database 240, the application starter 250, and the data repository 260 reside on a single machine having a memory and at least one hardware processor. In some example embodiments, one or more of the database 210, the distributed data store 220, the change stream processing application 230, the time series database 240, the application starter 250, and the data repository 260 reside on different machines. The database 210, the distributed data store 220, the time series database 240, and the data repository 260, or a portion thereof, can be incorporated into the database(s) 126 of FIG. 1.

In some example embodiments of the streaming platform system 150 is configured to process streams of data records as they occur, storing them in a fault-tolerant and durable way, and publishing the streams of data records for use by consumers. A stream refers to constant incoming flow of messages (e.g., messages of a similar type or category). For example, a stream of data records may comprise all the updates to a database, all the logs produced by a service, or any other type of event data. The term "streaming" may refer to processing streams of incoming data in real-time.

In some example embodiments, the database 210 stores any changes to data of an online service (e.g., content of a website), such as insert, update, or delete data activity, as the changes commit to one or more tables of the online service. A commit is the final step in the successful completion of a previously started database change as part of handling a transaction in a computing system, making one or more tentative changes permanent. In some example embodiments, the database 210 comprises a change data capture (CDC) sink 212 configured to detect, capture, receive, or otherwise determine the committed data changes, and then store indications of the committed data changes in log files 222 (e.g., log files 222-1, . . . , 222-N) of the distributed data store 220. In this way, as inserts, updates, and deletes are applied to tracked source tables of the database 212, entries that describe those changes are added to a commit log in the distributed data store 220. In some example embodiments, the CDC sink 212 converts the change data into a data structure having a change event format comprising the delta of the change event, which is then stored as a data record in a log file 222 in the distributed data store 220.

In some example embodiments, the change stream processing application 230 is configured to consume the data records stored in the log files 222 of the distributed data store 220, using the consumed data records as source data 232, which is processed via one or more transformation operations 234 to convert the data records from one format into another format. The processed data records may then be written to a sink 236. In some example embodiments, the sink 236 is configured to store the processed data records in the data repository 260 for use by one or more consumers of the streaming platform system 150, such as applications that use the streaming data of the streaming platform system 150 for display to end users on client devices.

In some example embodiments, the components of the streaming platform system 150 are run as a cluster on one or more servers called brokers that may span multiple datacenters. The cluster may store streams of data records in categories called topics. A topic is a category or feed name to which data records are published. The streams of data records may be received as messages from processed called producers, and the data may be partitioned into different partitions with different topics that may be distributed across cluster nodes. Each partition is an ordered, immutable sequence of data records that is continually appended to (e.g., a structured commit log). The data records in the partitions may each be assigned a sequential identification number called the offset that uniquely identifies each data record within the partition. Within a partition, data records may be ordered, indexed, and stored by their offsets (e.g., the position of a data record within a partition).

Other processes called consumers can read data records from partitions. Consumers may label themselves with a consumer group name, and each record published to a topic may be delivered to one consumer instance within each subscribing consumer group. Consumer instances can be in separate processes or on separate machines. A producer API may enable an application to publish streams of data records via the streaming platform system 150, while a consumer API may enable an application to subscribe to topics and process streams of data records. In some example embodiments, the streaming platform system 150 durably persists all published records, whether or not they have been consumed, using a configurable retention period. The partitions of the log file may be distributed over the servers in the cluster with each server handling data and requests for a share of the partitions, and each partition may be replicated across a configurable number of servers for fault tolerance.

In some example embodiments, the change stream processing application 230 comprises a stream processor that is configured to take continual streams of data records from input topics, perform some processing on this input, and produce continual streams of data to output topics. For example, a retail application may take in input streams of sales and shipments and output a stream of reorders and price adjustments computed off this data. In some example embodiments, raw input data is consumed from topics and then aggregated, enriched, or otherwise transformed into new topics for further consumption or follow-up processing. For example, a processing pipeline for recommending content may crawl online content from data feeds and publish the content to a particular topic, further processing may normalize or deduplicate this content and publish the cleansed content to a new topic, and a final processing stage may attempt to recommend this content to users. Such processing pipelines may create graphs of real-time data flows based on the individual topics.

Figure 3:
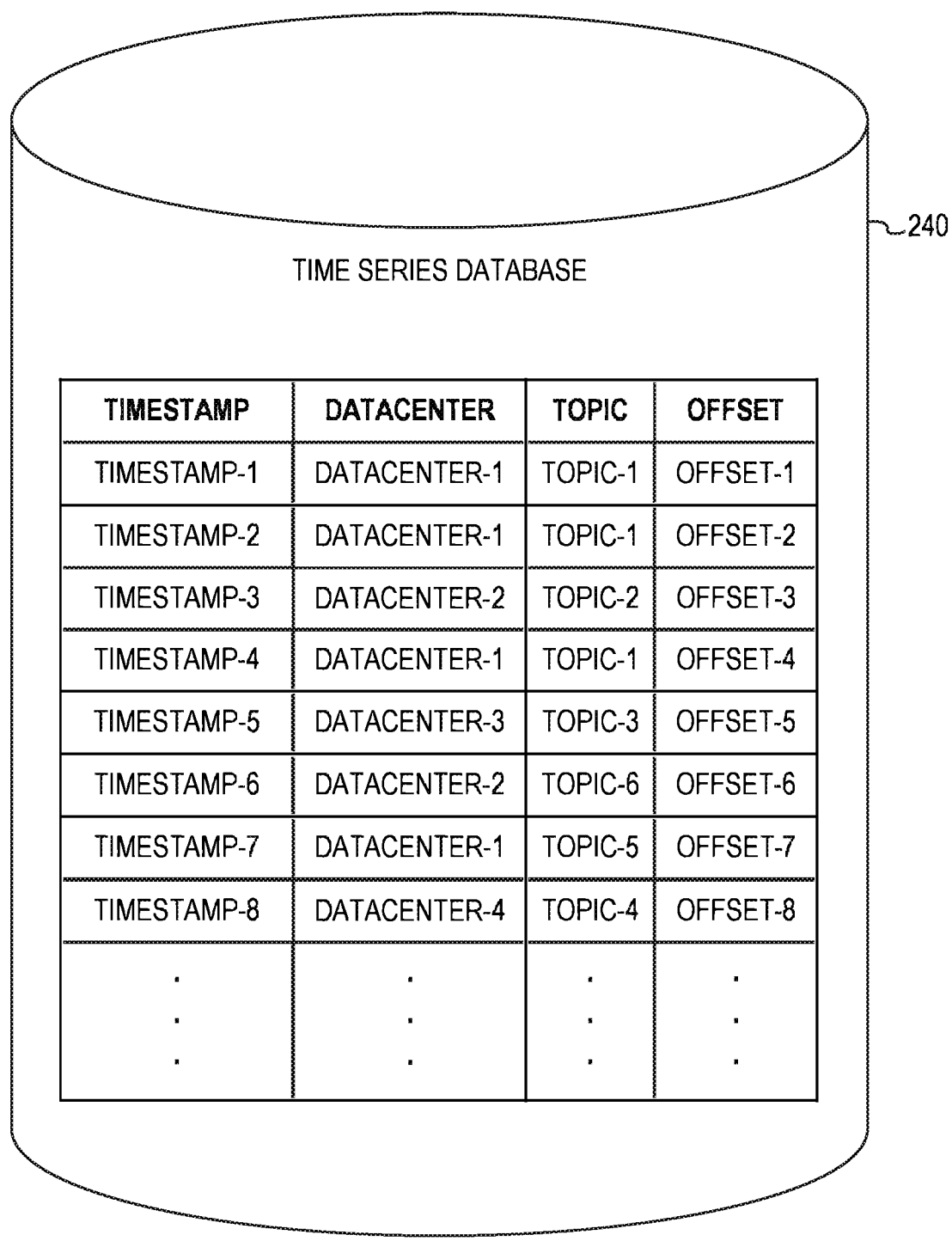
FIG. 3 illustrates a time series database, in accordance with some example embodiments.

Referring back to FIG. 2, in some example embodiments, the sink 236 is configured to, in response to or otherwise based on the storing of a processed data record in the data repository 260, store the corresponding offset value of the processed data record in the time series database 240 in association with a corresponding timestamp. FIG. 3 illustrates the time series database 240, in accordance with some example embodiments. In the example embodiment of FIG. 3, multiple offset values (e.g., OFFSET-1, OFFSET-2, . . . , OFFSET-N) are each stored in association with a corresponding timestamp (e.g., TIMESTAMP-1, TIMESTAMP-2, . . . , TIMESTAMP-N). In some example embodiments, each offset value is also stored in association with one or more other attributes, such as an identification of a corresponding datacenter for the data record to which the offset value corresponds (e.g., DATACENTER-1, DATACENTER-2, DATACENTER-3, . . . ) and an identification of a corresponding topic for the data record to which the offset value corresponds (e.g., TOPIC-1, TOPIC-2, TOPIC-3, . . . ). In some example embodiments, each offset value belongs to a particular topic and partition along with other key informational labels. A topic may have many partitions and, therefore, can have many offset values as partitions for the topic for each collection of metrics. Notably, the timestamps along with the offsets may be stored during data production—synchronously or asynchronously with the data production. Other attributes are also within the scope of the present disclosure. One example of a schema for the time series database 240 is provided below with example values:

name: "partitionOffsets"
    namespace: "nudata"
    subsystem: "gsifeeder"
    labels and values
        feeder: "gsi"
        region: "NA"
        datacenter: "SLC"
        keyspace: "ItemListings"
        topic: "item.t2"
        partition: 1
        offset: 1055
        timestamp: 04-17-2019: 13:21:09
        clusterName: xxx
        componentId: "3081"
        instance: "10.147.171.87:9500"
        job: "gsi-flink-pods-9500"

Of course, any of these fields may be stored in the same table, related tables, or related databases via joins or associations. The time series database 240 may be combined with the database 210 or maintained separately. The time series database 240 may also collect and store other data from the change stream processing application 230 for performance and error monitoring. Such other data may comprise measurements or events that are tracked, monitored, and aggregated over time, and may include server metrics, application performance monitoring, network data, sensor data, events, clicks, and many other types of analytics data.

Referring back to FIG. 2, in some example embodiments, the application starter 250 is configured to retrieve an offset value from the time series database 240 using a time parameter. For example, the application starter 250 may synchronously read the offset value from the time series database 240 via hypertext transfer protocol (HTTP) using the time parameter. The time parameter may comprise a single point in time (e.g., a specific date and time of day) or a time range having a start time (e.g., a specific start date and start time) and an end time (e.g., a specific end date and end time). However, other types of time parameters are also within the scope of the present disclosure. In some example embodiments, the application starter 250 issues a query comprising the time parameter to the time series database 240 to retrieve the offset value. Below is one example of a query that may be used to find the offset(s) that belong to a component "x", located at data center "slc", and other filters for a given time range:

```
http://<prometheus-server>:<port>/api/v1/query_range?query=
monstor_cdc_partitionOffsets{
label1="x",label2="slc",label3="ItemListing|User",label4="NA
"}
&start=2018-02-04T08:53:34.767Z
&end=2018-02-04T08:53:39.854Z
&step=20s
```

And, below is one example of a corresponding response to the above query with the offset highlighted in bold:

```
monstor_cdc_partitionOffsets{
clusterName="rhs-sample-tm",componentID=   "3081",
datacenter="slc", feeder="gsi", instance="10.000.000.87:950",
job="gsi-flink-pods-9500",         keyspace="Listing",
kubernetes_io_hostname="yyy-node-z21w6-
2125230.phx02.dev.ebayc3.com",      memberId="1",
milkyway="milkyway-staging",   name="rhs-sample-tm-phx",
namespace="rheos-streaming-qa",    offset=   "250439687",
partition="1",  pod_name="rhs-sample-tm-phx-1128650763-
14jmn",  pod_template_hash="1128650755",  region="NA",
serviced="5253",             serviceName="rhs-sample",
serviceType="flink",             topic="item.t1",
type="flink",zone="phx"}
```

In some example embodiments, the application starter 250 is configured to transmit a data request comprising the retrieved offset value to the change stream processing application 230. The data request may be configured or otherwise operable to retrieve a data record stored in association with the retrieved offset value in a storage layer of the stream-processing platform using the offset value. For example, the data request may be configured to cause the change stream processing application 230 to look up and return the data record corresponding to the offset value included in the data request from the log files 222 in the distributed data store 220. FIG. 4 illustrates a distributed data store 220 for log files 222, in accordance with some example embodiments.

In the example embodiment of FIG. 4, the data records comprise change data (e.g., CHANGE DATA-1, CHANGE DATA-2, . . . , CHANGE DATA-N) that are each stored in association with their corresponding offset value (e.g., OFFSET-1, OFFSET-2, . . . , OFFSET-N). Each change data may indicate at least one change to content of an online site. In some example embodiments, each change data, or other type of data record, is also stored in association with one or more other attributes, such as an identification of a corresponding datacenter for the data record and an identification of a corresponding topic for the data record. Other attributes are also within the scope of the present disclosure.

In some example embodiments, the data request is further operable to reposition a stream of data published from the streaming platform system 150 to an application at a position corresponding to the offset value included in the data request. The retrieval of the offset value by the application starter 250 and the use of the retrieved offset value in the data request from the application starter 250 to the change stream processing application 230 may be performed in response to, or otherwise based on, an interruption of the change stream processing application 230 publishing a stream of data to an application. For example, the application starter 250 may detect that a network or system failure has occurred and be triggered by such failure detection to retrieve the offset value and use it in a data request to the change stream processing application 230 replay or reposition the processing of the change stream processing application 230 to a position corresponding to a point in time just before the network or system failure.

By storing the offset values of the data records in the time series database 240, the streaming platform system 150 of the present disclosure solves the technical problems of prior solutions and improves the functioning of the underlying computer system. The storage of the offset values in the time series database 240 makes it straightforward and easy for the application starter 250 to query for the offset value that corresponds to a particular point in time, thereby enabling the processors of the streaming platform system 150 to reprocess the database changes, or other data records, from a specific timestamp or that belong to a time range between start and end timestamps. As an additional feature, tracking the offset values this way provides another way of monitoring the liveliness of the data stream of the streaming platform system 150, as the offset values can be queried and displayed as a metric. The streaming platform system 150 provides a multipurpose time series database that offers both offset management separate from the storage of the data records in the storage layer of the streaming platform system 150 and use of the time series database 240 to monitor metrics of the change stream processing application 230.

Additionally, the use of the time series database 240 to store the offset values of data records of the data stream of the streaming platform system 150 improves the accuracy, effectiveness, and efficiency of accessing specific points in the data stream, as well as facilitates recovery of the streaming platform system 150 from network or system failure. This use of the time series database 240 to store the offset values also reduces data query errors, since the application starter 250 may accurately retrieve the most appropriate offset value using a specific time parameter for the specific data record being targeted by the application starter 250. Additionally, the use of the time series database 240 to manage offsets, as disclosed herein, reduces dependency on a specific version of an API to identify and access a particular point in the data stream, thereby improving the flexibility and accessibility of the streaming platform computer system.

Figure 5:
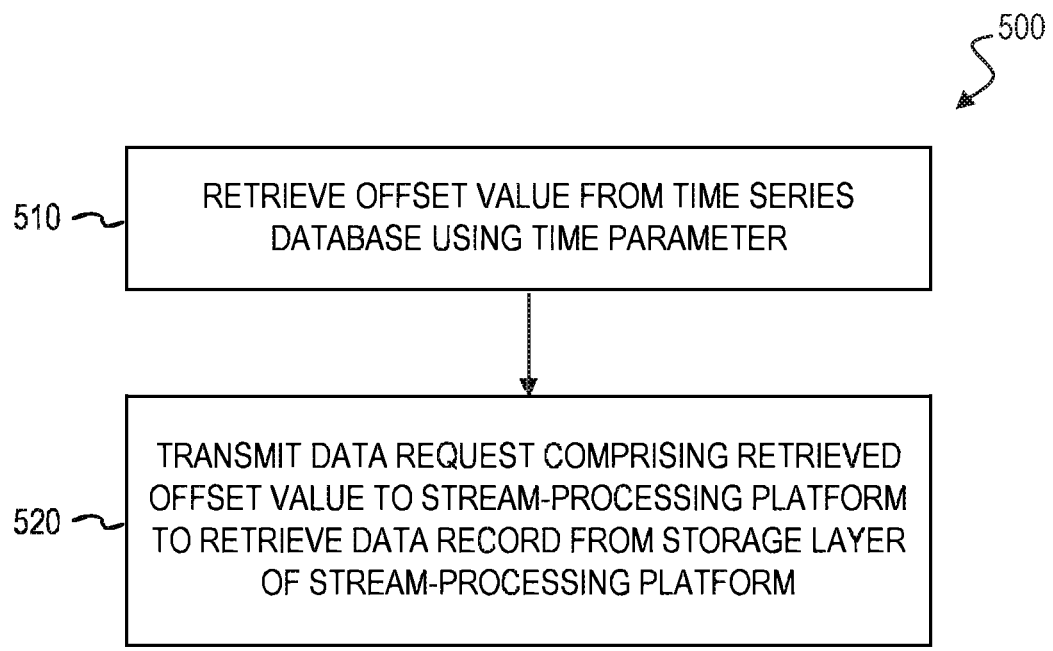
FIG. 5 is a flowchart illustrating a method of improving the functioning of a streaming platform system by managing database change stream offsets using a time series database, in accordance with some example embodiments.

FIG. 5 is a flowchart illustrating a method 500 of improving the functioning of a streaming platform system by managing database change stream offsets using a time series database, in accordance with some example embodiments. The operations of method 500 can be performed by a system or modules of a system. The operations of method 500 can be performed by processing logic that can comprise hardware (e.g., circuitry, dedicated logic, programmable logic, microcode, etc.), software (e.g., instructions run on a processing device), or a combination thereof. In one example embodiment, the method 500 is performed by the streaming platform system 150 of FIGS. 1 and 2, or any combination of one or more of its components or modules (e.g., the application starter 250, the change stream processing application 230), as described above.

At operation 510, the streaming platform system 150 retrieves an offset value from a plurality of offset values stored in a time series database. For example, the application starter 250 may retrieve the offset value from the time series database 240, as previously discussed. The offset values may be indexed in the time series database 240 in time order and the retrieved offset value may be retrieved using a time parameter. In some example embodiments, the time parameter comprises a single point in time. In some example embodiments, the time parameter comprises a time range having a start time and an end time. Other types of time parameters are also within the scope of the present disclosure. In some example embodiments, the retrieving of the offset value at operation 510 is performed in response to a detection by the application starter 250 of an interruption of the change stream processing application 230 publishing a stream of data to an application. However, other triggers for the performance of the retrieval of the offset value at operation 510 are also within the scope of the present disclosure.

At operation 520, the streaming platform system 150 transmits a data request to a stream-processing platform. For example, the application starter 250 may transmit the data request to the change stream processing application 230. In some example embodiments, the data request comprises the retrieved offset value, and the data request is operable to retrieve a data record stored in association with the retrieved offset value in a storage layer of the stream-processing platform using the offset value. For example, the data record may be retrieved from the log file(s) 222 in the distributed data store 220 using the retrieved offset value as an index to identify the corresponding data record. In some example embodiments, the data record comprises change data indicating at least one change to content of an online site. However, other types of data records are also within the scope of the present disclosure. In some example embodiments, the data request is further operable to reposition a stream of data published from the stream-processing platform to an application at a position corresponding to the retrieved offset value, such as in situations where an interruption of the change stream processing application 230 publishing a stream of data to an application has been detected, as previously discussed.

It is contemplated that the operations of method 500 can incorporate any of the other features disclosed herein.

Figure 6:
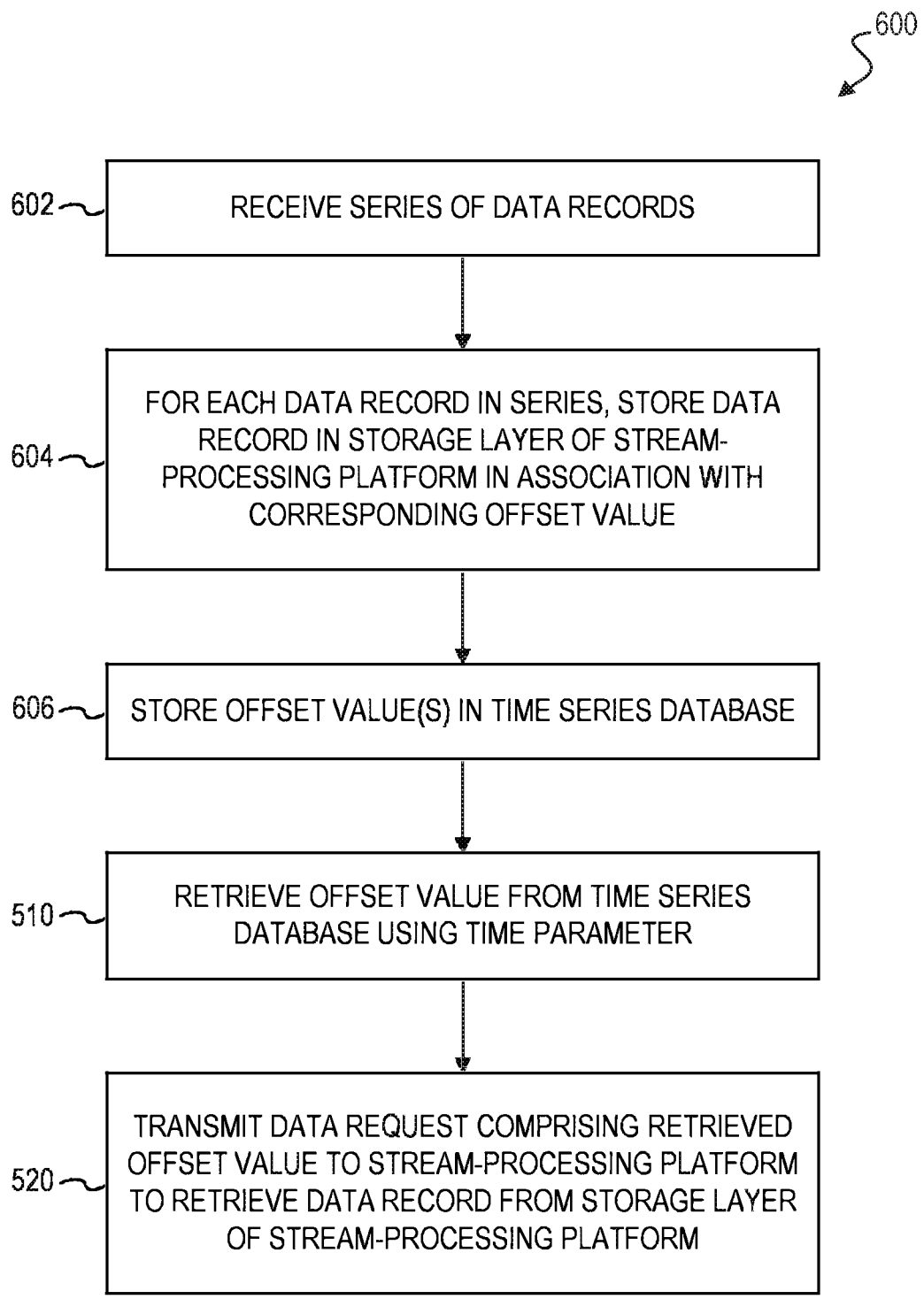
FIG. 6 is a flowchart illustrating another method of improving the functioning of a streaming platform system by managing database change stream offsets using a time series database, in accordance with some example embodiments.

FIG. 6 is a flowchart illustrating another method 600 of improving the functioning of a streaming platform system by managing database change stream offsets using a time series database, in accordance with some example embodiments. The operations of method 600 can be performed by a system or modules of a system. The operations of method 600 can be performed by processing logic that can comprise hardware (e.g., circuitry, dedicated logic, programmable logic, microcode, etc.), software (e.g., instructions run on a processing device), or a combination thereof. In one example embodiment, the method 600 is performed by the streaming platform system 150 of FIGS. 1 and 2, or any combination of one or more of its components or modules (e.g., the application starter 250, the change stream processing application 230), as described above.

In some example embodiments, the method 600 comprises operations 602, 604, and 606 being performed prior to the performance of operations 510 and 520 of the method 500 in FIG. 5. At operation 602, the streaming platform system 150 receives a series of data records. For example, the change stream processing application 230 may receive a series of data records comprising change data from the database 210. At operation 604, the streaming platform system 150, for each one of the data records in the series of data records, stores the data record in the storage layer of the stream-processing platform in association with a corresponding one of the plurality of offset values. For example, each data record may be stored in a log file 222 of the distributed data store 220. At operation 606, the streaming platform system 150, for each one of the plurality of offset values, stores the offset value in the time series database. For example, the change stream processing application 230 may store each offset value that is stored in the distributed data store 220 in the time series database 240. Each offset value may be stored in the time series database 240 in association with a corresponding timestamp for subsequent retrieval using a time parameter.

In some example embodiments, the change stream processing application 230 writes, or otherwise stores, the successfully processed offset values in the time series database 240 at a fixed periodic time. While, in some example embodiments, the change stream processing application 230 may store each successfully processed offset value in the time series database 240, in other example embodiments, the only offset values that the change stream processing application 240 writes to the time series database 240 are the offset values that are successfully processed at a time corresponding to the fixed periodic time. In one example where the change stream processing application 240 successfully processes an offset value X at time T1, an offset value Y at time T2, and an offset value Z at time T3, the change stream processing application 240 may only store the offset value Z, and not offset values X and Y, in the time series database 240 if T3 corresponds to the fixed periodic time at which the offset values are written to the time series database 240.

It is contemplated that the operations of method 600 can incorporate any of the other features disclosed herein.

Figure 7:
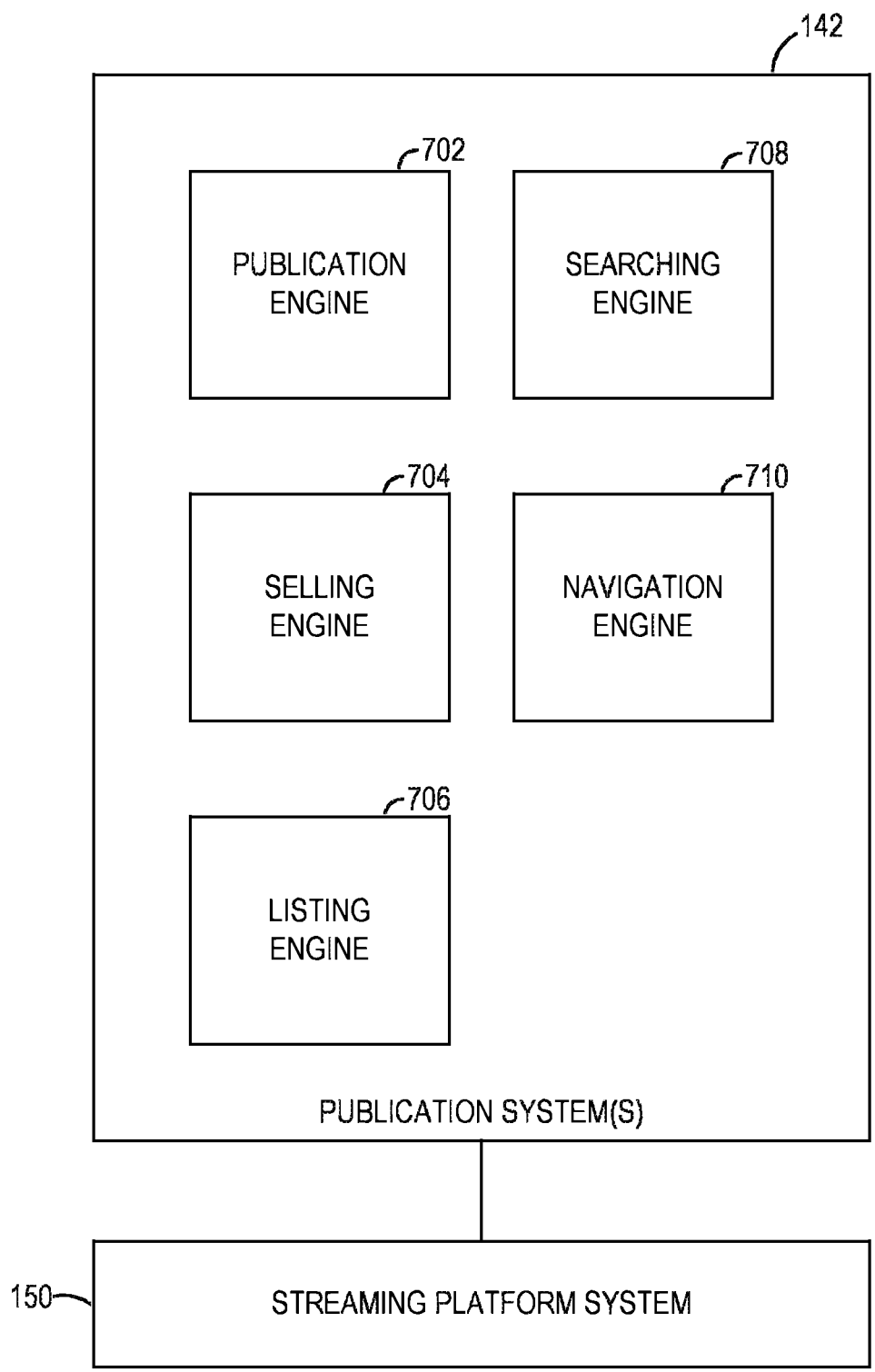
FIG. 7 is a block diagram illustrating various components of a network-based publication system, in accordance with some example embodiments.

FIG. 7 is a block diagram illustrating various components of the network-based publication system 142, in accordance with some example embodiments. The publication system 142 can be hosted on dedicated or shared server machines that are communicatively coupled to enable communications between server machines. The components themselves are communicatively coupled (e.g., via appropriate interfaces) to each other and to various data sources, so as to allow information to be passed between the components or so as to allow the components to share and access common data. Furthermore, the components can access one or more databases 126 via the database servers 124.

The publication system 142 can provide a number of publishing, listing, and/or price-setting mechanisms whereby a seller (also referred to as a first user) can list (or publish information concerning) goods or services for sale or barter, a buyer (also referred to as a second user) can express interest in or indicate a desire to purchase or barter such goods or services, and a transaction (such as a trade) can be completed pertaining to the goods or services. To this end, the publication system 142 can comprise at least one publication engine 702 and one or more selling engines 704. The publication engine 702 can publish information, such as item listings or product description pages, on the publication system 142. In some embodiments, the selling engines 704 can comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines can also provide a number of features in support of these auction-format listings, such as a reserve price feature whereby a seller can specify a reserve price in connection with a listing and a proxy-bidding feature whereby a bidder can invoke automated proxy bidding. The selling engines 704 can further comprise one or more deal engines that support merchant-generated offers for products and services.

A listing engine 706 allows sellers to conveniently author listings of items or authors to author publications. In one embodiment, the listings pertain to goods or services that a user (e.g., a seller) wishes to transact via the publication system 142. In some embodiments, the listings can be an offer, deal, coupon, or discount for the good or service. Each good or service is associated with a particular category. The listing engine 706 can receive listing data such as title, description, and aspect name/value pairs. Furthermore, each listing for a good or service can be assigned an item identifier. In other embodiments, a user can create a listing that is an advertisement or other form of information publication. The listing information can then be stored to one or more storage devices coupled to the publication system 142 (e.g., databases 126). Listings also can comprise product pages that display a product and information (e.g., product title, specifications, descriptions, and reviews) associated with the product. In some embodiments, the product page can include an aggregation of item listings that correspond to the product described on the product page.

The listing engine 706 can also allow buyers to conveniently author listings or requests for items desired to be purchased. In some embodiments, the listings can pertain to goods or services that a user (e.g., a buyer) wishes to transact via the publication system 142. Each good or service is associated with a particular category. The listing engine 706 can receive as much or as little listing data, such as title, description, and aspect name/value pairs, that the buyer is aware of about the requested item. In some embodiments, the listing engine 706 can parse the buyer's submitted item information and can complete incomplete portions of the listing. For example, if the buyer provides a brief description of a requested item, the listing engine 706 can parse the description, extract key terms, and use those terms to make a determination of the identity of the item. Using the determined item identity, the listing engine 706 can retrieve additional item details for inclusion in the buyer item request. In some embodiments, the listing engine 706 can assign an item identifier to each listing for a good or service.

In some embodiments, the listing engine 706 allows sellers to generate offers for discounts on products or services. The listing engine 706 can receive listing data, such as the product or service being offered, a price and/or discount for the product or service, a time period for which the offer is valid, and so forth. In some embodiments, the listing engine 706 permits sellers to generate offers from the sellers' mobile devices. The generated offers can be uploaded to the publication system 142 for storage and tracking.

Searching the publication system 142 is facilitated by a searching engine 708. For example, the searching engine 708 enables keyword queries of listings published via the publication system 142. In example embodiments, the searching engine 708 receives the keyword queries from a device of a user and conducts a review of the storage device storing the listing information. The review will enable compilation of a result set of listings that can be sorted and returned to the client device 110 of the user. The searching engine 708 can record the query (e.g., keywords) and any subsequent user actions and behaviors (e.g., navigations).

The searching engine 708 also can perform a search based on the location of the user. A user can access the searching engine 708 via a mobile device and generate a search query. Using the search query and the user's location, the searching engine 708 can return relevant search results for products, services, offers, auctions, and so forth to the user. The searching engine 708 can identify relevant search results both in a list form and graphically on a map. Selection of a graphical indicator on the map can provide additional details regarding the selected search result. In some embodiments, the user can specify as part of the search query a radius or distance from the user's current location to limit search results.

The searching engine 708 also can perform a search based on an image. The image can be taken from a camera or imaging component of a client device or can be accessed from storage.

In a further example, a navigation engine 710 allows users to navigate through various categories, catalogs, or inventory data structures according to which listings can be classified within the publication system 142. For example, the navigation engine 710 allows a user to successively navigate down a category tree comprising a hierarchy of categories (e.g., the category tree structure) until a particular set of listings is reached. Various other navigation applications within the navigation engine 710 can be provided to supplement the searching and browsing applications. The navigation engine 710 can record the various user actions (e.g., clicks) performed by the user in order to navigate down the category tree.

Figure 8:
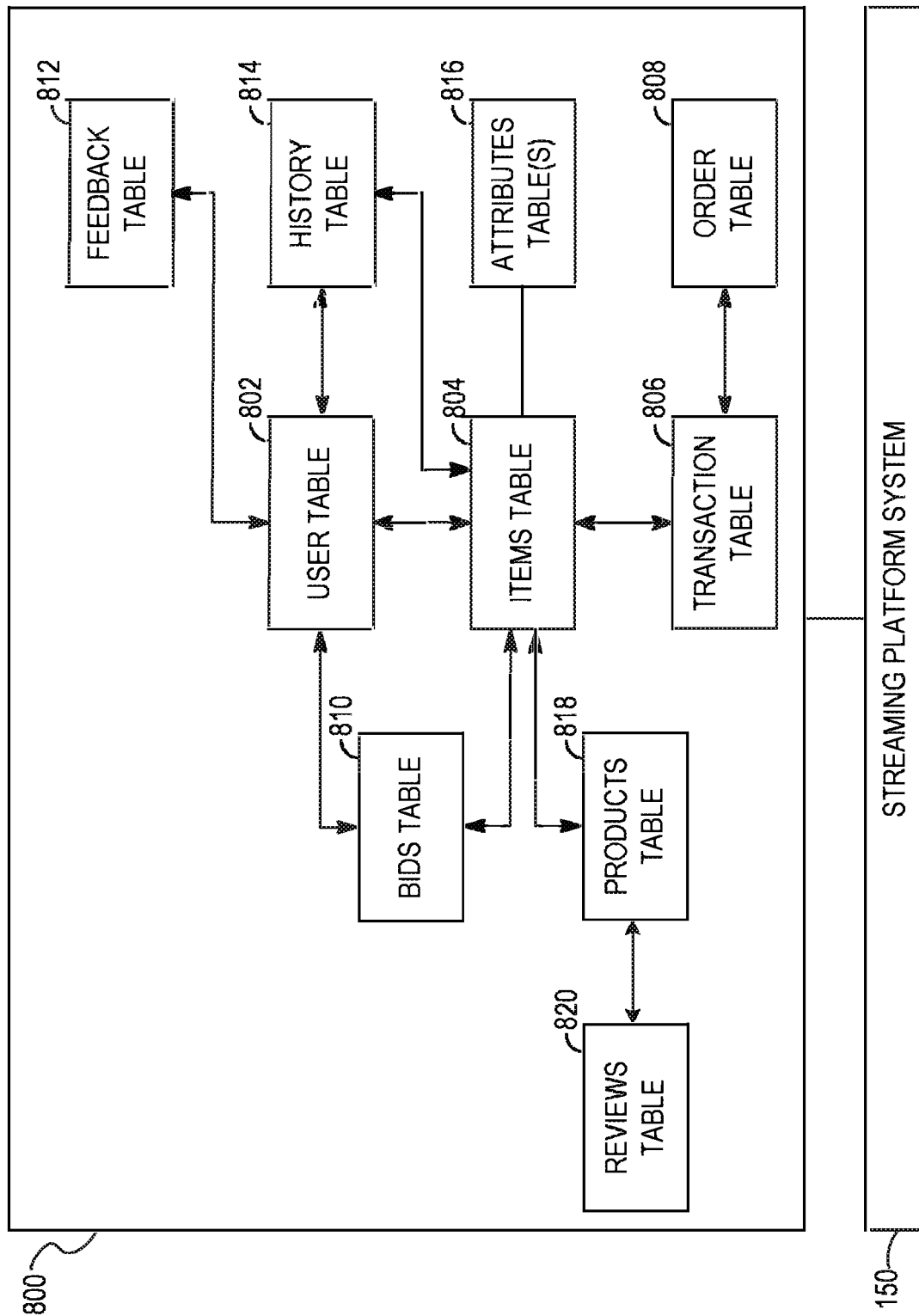
FIG. 8 is a block diagram illustrating various tables that can be maintained within a database, in accordance with some example embodiments.

FIG. 8 is a high-level entity-relationship diagram, illustrating various tables 800 that can be maintained within the database(s) 126, and that are utilized by and support the systems 142, 144, and 150. A user table 802 contains a record for each registered user of the networked system 102, and can include identifier, address and financial instrument information pertaining to each such registered user. A user can operate as a seller, a buyer, or both, within the networked system 102. In one example embodiment, a buyer can be a user that has accumulated value (e.g., commercial or proprietary currency), and is accordingly able to exchange the accumulated value for items that are offered for sale by the networked system 102.

The tables 800 also include an items table 804 in which are maintained item records for goods and services that are available to be, or have been, transacted via the networked system 102. Each item record within the items table 804 can furthermore be linked to one or more user records within the user table 802, so as to associate a seller and one or more actual or potential buyers with each item record.

A transaction table 806 contains a record for each transaction (e.g., a purchase or sale transaction) pertaining to items for which records exist within the items table 804. An order table 808 is populated with order records, with each order record being associated with an order. Each order, in turn, can be associated with one or more transactions for which records exist within the transaction table 806.

Bid records within a bids table 810 each relate to a bid received at the networked system 102 in connection with an auction-format listing supported by an auction application. A feedback table 812 is utilized by one or more reputation applications, in one example embodiment, to construct and maintain reputation information concerning users. A history table 814 maintains a history of transactions to which a user has been a party. One or more attributes tables 816 record attribute information pertaining to items for which records exist within the items table 804. Considering only a single example of such an attribute, the attributes tables 816 can indicate a currency attribute associated with a particular item, with the currency attribute identifying the currency of a price for the relevant item as specified by a seller.

In some example embodiments, the tables 800 also include a products table 818 in which are maintained product records for goods and services that are available to be, or have been, transacted via the networked system 102. Each product record within the products table 818 can furthermore be linked to one or more user records within the user table 802, so as to associate a seller and one or more actual or potential buyers with each item record. In some example embodiments, a reviews table 820 is utilized by one or more review applications, in one example embodiment, to construct and maintain reviews concerning products. Such product reviews can be authored and submitted by users and can include, but are not limited to, text-based information describing a user's experience with the corresponding product, as well as one or more user-submitted ratings of the product, such as one or more graphical user interface elements that represent a rating (e.g., a star-based ratings system).

The streaming platform system 150 may be communicatively coupled to (e.g., in communication with) any of the components of the publication system 142 in FIG. 7 or any of the tables 800 in FIG. 800 in FIG. 8. In some example embodiments, the data records that are processed by the streaming platform system 150 comprise any of combination of the data discussed above with respect to the publication system 142 in FIG. 7 or the tables 800 in FIG. 8. However, other types of data of the data records are also within the scope of the present disclosure.

It is to be appreciated the embodiments described herein will work with any system requiring data to be sourced and stored at a high rate—they may be used in cloud environments, data center environments, on servers, desktops, or mobile devices. It may be, for example, that a system to facilitate storage and subsequent access to high volume data is available as a web service from a cloud data center provider.

It is contemplated that any features of any embodiments disclosed herein can be combined with any other features of any other embodiments disclosed herein. Accordingly, any such hybrid embodiments are within the scope of the present disclosure.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a programmable processor. Once configured by such software, hardware modules become specific machines (or specific components of a machine) uniquely tailored to perform the configured functions. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a processor configured by software to become a special-purpose processor, the processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-8 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the features of the present disclosure in different contexts from the disclosure contained herein.

Figure 9:
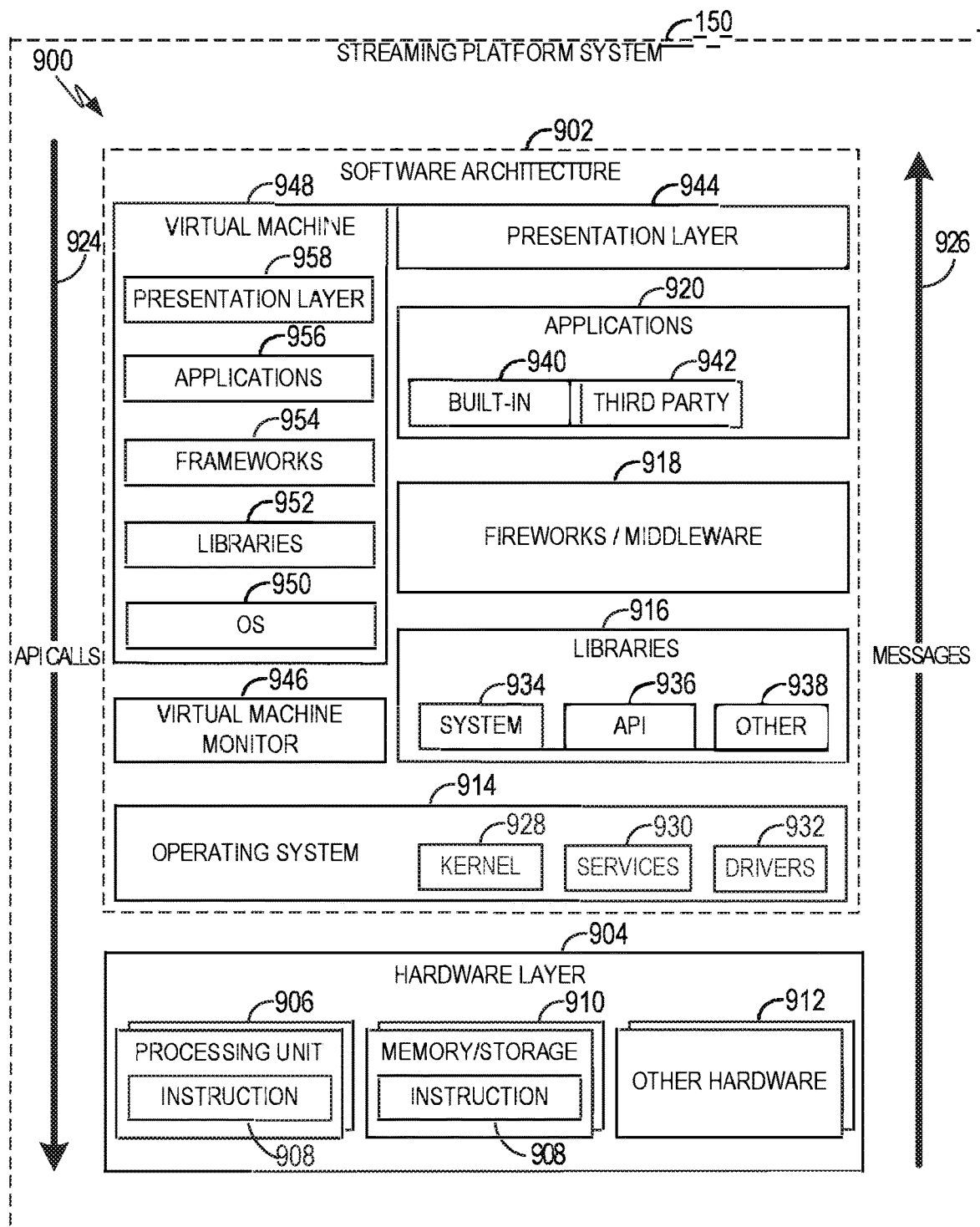
FIG. 9 is a block diagram illustrating a representative software architecture, in accordance with some example embodiments.

FIG. 9 is a block diagram 900 illustrating a representative software architecture 902, which may be used in conjunction with various hardware architectures herein described. FIG. 9 is merely a non-limiting example of a software architecture 902 and it will be appreciated that many other architectures may be implemented to facilitate the functionality described herein. The software architecture 902 may be executing on hardware such as a machine 1000 of FIG. 10 that includes, among other things, processors 1010, memory/storage 1030, and I/O components 1050. A representative hardware layer 904 is illustrated in FIG. 9 and can represent, for example, the machine 1000 of FIG. 10. The representative hardware layer 904 comprises one or more processing units 906 having associated executable instructions 908. The executable instructions 908 represent the executable instructions of the software architecture 902, including implementation of the methods, modules, and features disclosed above with respect to FIGS. 1-8. The hardware layer 904 also includes memory and/or storage modules 910, which also have the executable instructions 908. The hardware layer 904 may also comprise other hardware 912, which represents any other hardware of the hardware layer 904, such as the other hardware illustrated as part of the machine 1000.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920, and a presentation layer 944. Operationally, the applications 920 and/or other components within the layers may invoke application programming interface (API) calls 924 through the software stack and receive a response, returned values, and so forth, illustrated as messages 926, in response to the API calls 924. The layers illustrated are representative in nature and not all software architectures have all layers. For example, some mobile or special purpose operating systems may not provide a frameworks/middleware 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 or other components or layers. The libraries 916 typically provide functionality that allows other software modules to perform tasks in an easier fashion than to interface directly with the underlying operating system 914 functionality (e.g., kernel 928, services 930, and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks/middleware 918 may provide a higher-level common infrastructure that may be utilized by the applications 920 or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 920 or other software components/modules, some of which may be specific to a particular operating system or platform.

The applications 920 include built-in applications 940 or third party applications 942. Examples of representative built-in applications 940 may include, but are not limited to, a contacts application, a browser application, a book reader application, a location application, a media application, a messaging application, or a game application. The third party applications 942 may include any of the built in applications 940 as well as a broad assortment of other applications. In a specific example, the third party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 942 may invoke the API calls 924 provided by the mobile operating system such as the operating system 914 to facilitate functionality described herein.

The applications 920 may utilize built-in operating system functions (e.g., kernel 928, services 930, and/or drivers 932), libraries (e.g., system libraries 934, API libraries 936, and other libraries 938), and frameworks/middleware 918 to create user interfaces to interact with users of the system. Alternatively, or additionally, in some systems, interactions with a user may occur through a presentation layer, such as the presentation layer 944. In these systems, the application/module "logic" can be separated from the aspects of the application/module that interact with a user.

Some software architectures utilize virtual machines. In the example of FIG. 9, this is illustrated by a virtual machine 948. A virtual machine creates a software environment where applications/modules can execute as if they were executing on a hardware machine (e.g., the machine of FIG. 10). A virtual machine is hosted by a host operating system (e.g., operating system 914) and typically, although not always, has a virtual machine monitor 946, which manages the operation of the virtual machine 948 as well as the interface with the host operating system (e.g., operating system 914). A software architecture executes within the virtual machine 948 such as an operating system 950, libraries 952, frameworks 954, applications 956, or presentation layer 958. These layers of software architecture executing within the virtual machine 948 can be the same as corresponding layers previously described or may be different.

Figure 10:
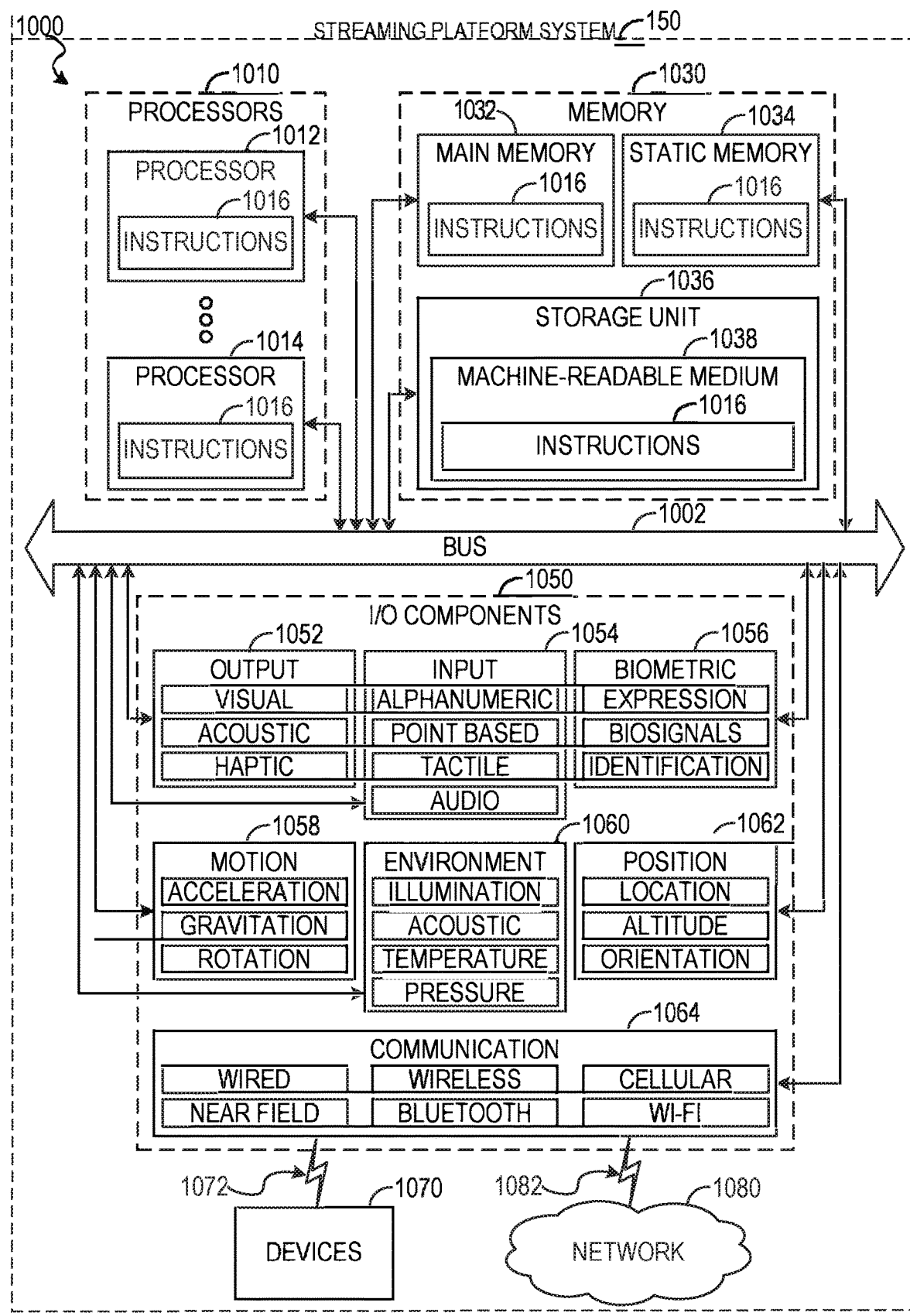
FIG. 10 is a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions may cause the machine 1000 to execute any one of the respective methods 500 and 600 of FIGS. 5 and 6. Additionally, or alternatively, the instructions 1016 may implement any combination of one or more of the components of the streaming platform system 150 of FIG. 2, and so forth. The instructions 1016 transform the non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1012 and processor 1014 that may execute instructions 1016. The term "processor" is intended to include multi-core processor that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core process), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000.

Accordingly, the memory 1032, the storage unit 1036, and the memory of processors 1010 are examples of machine-readable media.

As used herein, "machine-readable medium" means a device able to store or carry instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing or carrying instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable storage medium" refers to a single storage apparatus or device, as well as "cloud-based" storage systems or storage networks that include multiple storage apparatus or devices. The term "machine-readable medium" includes transmission media such as signals.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072 respectively. For example, the communication components 1064 may include a network interface component or other suitable device to interface with the network 1080. In further examples, communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as, location via Internet Protocol (IP) geo-location, location via Wi-Fi® signal triangulation, location via detecting a NFC beacon signal that may indicate a particular location, and so forth.

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to devices 1070. The term "transmission medium" shall be taken to include any computer-readable medium that is capable of encoding or carrying instructions 1016 for execution by the machine 1000, and includes digital or analog communications signals or other intangible medium to facilitate communication of such software.

In some example embodiments, any combination of one or more of the components of the software architecture 902 of FIG. 9, the representative hardware layer 904 of FIG. 9, and the machine 1000 of FIG. 10 are incorporated into the streaming platform system 150 to provide the software or hardware architecture of the streaming platform system 150.

The following numbered examples are embodiments.

1. A computer-implemented method comprising:
    retrieving, by one or more hardware processors, an offset value from a plurality of offset values stored in a time series database, the plurality of offset values being indexed in the time series database in time order, and the retrieved offset value being retrieved using a time parameter; and
    transmitting, by the one or more hardware processors, a data request to a stream-processing platform, the data request comprising the retrieved offset value, and the data request being operable to retrieve a data record stored in association with the retrieved offset value in a storage layer of the stream-processing platform using the offset value.

2. The computer-implemented method of example 1, further comprising:
    prior to the retrieving of the offset value, receiving, by the one or more hardware processors, a series of data records;
    for each one of the data records in the series of data records, storing, by the one or more hardware processors, the one of the data records in the storage layer of the stream-processing platform in association with a corresponding one of the plurality of offset values; and
    for each one of the plurality of offset values, storing, by the one or more hardware processors, the one of the plurality of offset values in the time series database.

3. The computer-implemented method of example 1 or example 2, wherein the data request is further operable to reposition a stream of data published from the stream-processing platform to an application at a position corresponding to the offset value.

4. The computer-implemented method of any one of examples 1 to 3, wherein the time parameter comprises a single point in time.

5. The computer-implemented method of any one of examples 1 to 4, wherein the time parameter comprises a time range having a start time and an end time.

6. The computer-implemented method of any one of examples 1 to 5, wherein the data record comprises change data indicating at least one change to content of an online site.

7. The computer-implemented method of any one of examples 1 to 6, wherein the retrieving of the offset value is performed in response to an interruption of the stream-processing platform publishing a stream of data to an application.

8. A system comprising:
    at least one processor; and
    a non-transitory computer-readable medium storing executable instructions that, when executed, cause the at least one processor to perform the method of any one of examples 1 to 7.

10. A non-transitory machine-readable storage medium, tangibly embodying a set of instructions that, when executed by at least one processor, causes the at least one processor to perform the method of any one of examples 1 to 7.

11. A machine-readable medium carrying a set of instructions that, when executed by at least one processor, causes the at least one processor to carry out the method of any one of examples 1 to 7.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   receiving, by one or more hardware processors, a series of data records in which the series of data records correspond to a data stream;
   for each one of the data records of the series of data records, storing, by the one or more hardware processors, the one of the data records in a storage layer of a stream-processing platform in association with a corresponding one of a plurality of offset values;
   querying, by the one or more hardware processors, an offset value from the plurality of offset values stored in a time series database by using a time parameter, in which the time parameter corresponds to a particular time and the one or more offset values correspond to the particular time; and
   transmitting, by the one or more hardware processors, a data request to the stream-processing platform, the data request comprising the offset value, and the data request being operable to retrieve a data record stored in association with the offset value in the storage layer of the stream-processing platform using the offset value.

2. The computer-implemented method of claim 1, wherein the data request is further operable to reposition a stream of data published from the stream-processing platform to an application at a position corresponding to the offset value.

3. The computer-implemented method of claim 1, wherein the particular time is a single point in time.

4. The computer-implemented method of claim 1, wherein the particular time is a time range including a start time and an end time.

5. The computer-implemented method of claim 1, wherein the data record comprises change data indicating at least one change to content of an online site.

6. The computer-implemented method of claim 1, wherein the querying is performed in response to an interruption of the stream-processing platform publishing a stream of data to an application.

7. The computer-implemented method of claim 1 further comprising for each one of the plurality of offset values, storing, by the one or more hardware processors, the one of the plurality of offset values in the time series database.

8. The computer-implemented method of claim 1, wherein the plurality of offset values is indexed in the time series database in time order.

9. A system comprising:
   at least one hardware processor; and
   a non-transitory memory device storing executable instructions that, when executed, cause the at least one hardware processor to perform to perform operations comprising:
   receiving a series of data records in which the series of data records correspond to a data stream;

for each one of the data records of the series of data records, storing the one of the data records in a storage layer of a stream-processing platform in association with a corresponding one of a plurality of offset values;
querying an offset value from the plurality of offset values stored in a time series database by using a time parameter, in which the time parameter corresponds to a particular time and the offset value corresponds to the particular time; and
transmitting a data request to the stream-processing platform, the data request comprising the offset value, and the data request being operable to retrieve a data record stored in association with the offset value in the storage layer of the stream-processing platform using the offset value.

10. The system of claim 9, wherein the operations further comprise:
for each one of the plurality of offset values, storing the one of the plurality of offset values in the time series database.

11. The system of claim 9, wherein the data request is further operable to reposition a stream of data published from the stream-processing platform to an application at a position corresponding to the offset value.

12. The system of claim 9, wherein the particular time is a single point in time.

13. The system of claim 9, wherein the particular time is a time range including a start time and an end time.

14. The system of claim 9, wherein the querying is performed in response to an interruption of the stream-processing platform publishing a stream of data to an application.

15. The system of claim 9, wherein the data record comprises change data indicating at least one change to content of an online site.

16. A non-transitory memory device storing a set of instructions that, when executed by at least one processor, causes the at least one processor to perform operations comprising:
receiving a series of data records in which the series of data records correspond to a data stream;
for each one of the data records of the series of data records, storing the one of the data records in a storage layer of a stream-processing platform in association with a corresponding one of a plurality of offset values;
querying one or more offset values from the plurality of offset values stored in a time series database by using a time parameter, in which the time parameter corresponds to a particular time and the one or more offset values correspond to the particular time; and
displaying the one or more offset values as a metric of the data stream.

17. The non-transitory memory device of claim 16, wherein the series of data records include change data.

18. The non-transitory memory device of claim 16, wherein the metric of the data stream is of a change stream processing application.

19. The non-transitory memory device of claim 16, wherein the metric of the data stream is a server metric.

20. The non-transitory memory device of claim 16, wherein the plurality of offset values is indexed in the time series database in time order.

* * * * *